B. D. LOCKWOOD.
SIDE BEARING FOR CARS.
APPLICATION FILED NOV. 29, 1911.
1,164,202.
Patented Dec. 14, 1915.
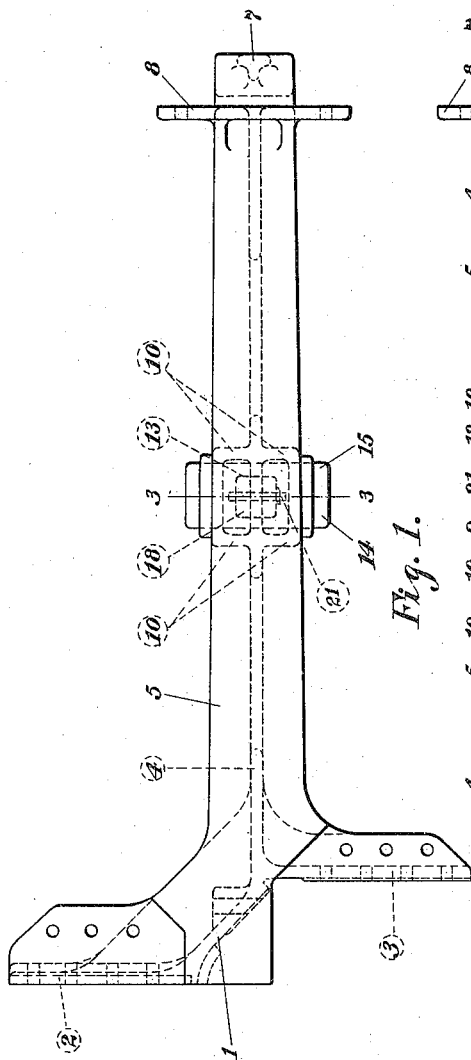
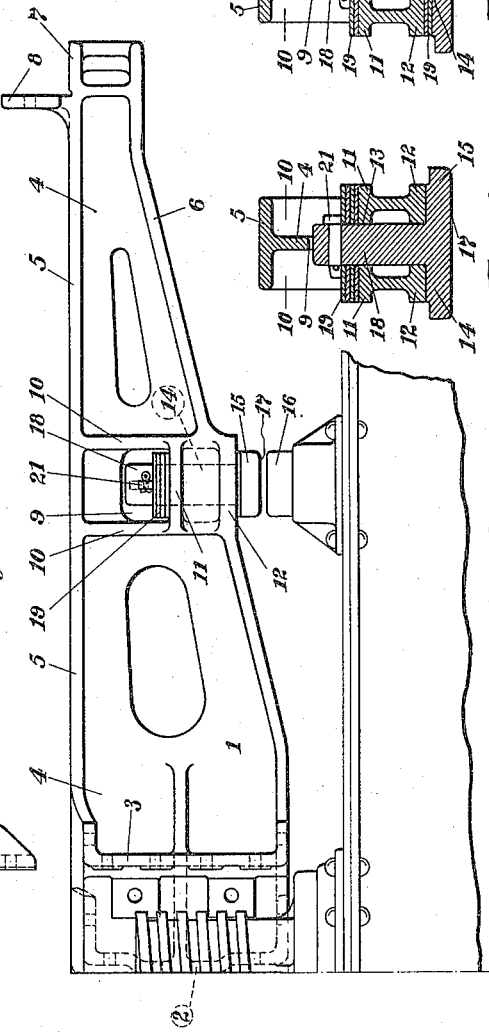
Witnesses
Frank E. Miller
Lela M. Grundler
Inventor
Burns D. Lockwood,
By G. C. Lambe,
Attorney

UNITED STATES PATENT OFFICE.

BURNS D. LOCKWOOD, OF BELLEVUE, PENNSYLVANIA, ASSIGNOR TO PRESSED STEEL CAR COMPANY, OF PITTSBURGH, PENNSYLVANIA, A CORPORATION OF NEW JERSEY.

SIDE BEARING FOR CARS.

1,164,202.   Specification of Letters Patent.   Patented Dec. 14, 1915.

Application filed November 29, 1911. Serial No. 663,109.

*To all whom it may concern:*

Be it known that I, BURNS D. LOCKWOOD, a citizen of the United States, residing at No. 444 Dawson avenue, Bellevue, in the county of Allegheny and State of Pennsylvania, have invented certain new and useful Improvements in Side Bearings for Cars, of which the following is a specification.

My invention relates to improvements in railway car side bearings in which one of said side bearing members is located on the under side of and toward the end of the body-bolster, and the other or lower member on the truck bolster immediately beneath said member located on said body bolster, there being a clearance space provided between said members, thereby adapting the trucks of a car so that they may change their positions with regard to the body of the car, by turning on their respective king pins, when it is necessary for the car to pass around a curve, and an object of my invention is to provide a means whereby such clearance space between the upper bearing member and the lower bearing member, of a set of such bearing members, may be adjusted, when, because of the bending or deformation of the body bolster, the clearance space originally provided becomes closed, thereby causing the bearing members to constantly bear or grind upon each other, so that when the car turns a curve, it does so with greater difficulty, has a greater tendency to leave the rails, and more readily wears away both the rails and flanges of the car wheels. The clearance space between the upper bearing member and the lower bearing member may also be adjusted, when, owing to excessive wear of either the upper bearing plate or lower bearing plate, or both, the clearance space originally provided becomes too great, permitting the car to rock on its trucks to an undesirable or dangerous extent, and endangering the safety of the car.

With these and other objects in view, the present invention consists in the combination and arrangement of parts, as will be hereinafter more fully described, shown on the accompanying drawings, and particularly pointed out in the appended claims it being understood that changes in the form, proportion, size and minor details may be made, within the scope of the claims, without departing from the spirit or sacrificing any of the advantages of the invention.

In the drawings, in which similar reference characters refer to similar parts throughout the several views, Figure 1 is a plan view of one half of a body bolster showing my new adjustable side bearing arranged thereon. Fig. 2 is a side elevational view of the same. Fig. 3 is a cross sectional view through the body bolster on line 3—3, showing my improved side bearing in position, and Fig. 4 shows a similar sectional view, adjustment having been made in the clearance between the two bearing members.

1 is one half of a body bolster made of cast steel or other cast metal having flanges 2, 3 which serve to connect the bolster to the center and draft sills respectively. 4 indicates the web of the bolster, and 5 and 6 the top and bottom flanges respectively. 7 indicates the end of the bolster on which the side sill rests and 8 represents an additional flange to which the side sill may be secured.

At a suitable point between the ends of the bolster an opening 9 is made in the web 4 of the bolster, such opening being provided with flanges 10, 10 of any suitable form for the purpose of strengthening the web of the bolster where it has been weakened as a result of making the opening 9 therein. An additional horizontal flange 11 is also provided which together with the horizontal portion 12 of the bottom flange 6, and the metal therebetween, are provided with an opening 13 adapted to receive and permit the passing therethrough of the stem of the side bearing member.

The side bearing member 14, is of approximately T shape, and consists of a lower or bearing portion 15, adapted to contact or coöperate with the lower bearing member 16 on the truck bolster, 17 indicating the bearing and wearing surface of the bearing member. The portion 15 is provided with a stem portion 18, which extends through the opening 13 in the body bolster web and lower flange members above referred to. The stem portion 18 is made longer than the length of the opening 13, and extends beyond it a sufficient distance to permit of the application thereon of a number of plate washers 19, and is also provided with an aperture 20 through which a key 21 may be passed to secure the bearing member in position in the bolster, although any other suitable means for securing the bearing member in the bolster may be used.

The washers 19 may be of any suitable number and thickness and may be placed either as shown in Fig. 3 of the drawings, or removed either singly or in any number from the position shown, and placed between the flange 12 of the bolster member and the upper side of the lower or bearing portion 15 of the side bearing member at the point indicated by the reference figure 22 and as illustrated in Fig. 4, or vice versa.

From the foregoing description it will be readily understood that in the event of the clearance space between the face 17 of the upper side bearing member 15, becoming excessive through wear or other causes, it is only necessary to remove the key 21 from the stem 18 of the bearing member, withdraw the stem 18 from the opening 13 in the bolster member, remove one or more of the washers 19, and place them on the stem 18 of the bearing member, so that they will occupy a position between the upper side of the lower or bearing portion 15 of the bearing member and the horizontal portion 12, of the lower flange 6 of the bolster member as shown in Fig. 4; or in the event of the washers being in position shown in Fig. 4, and the clearance space between the upper and lower side bearing members not being sufficient, the washers between the upper side of the lower or bearing portion 15 of the bearing member and the horizontal portion 12, of the lower flange 6, of the bolster member may be removed from position shown in Fig. 4, and placed in position as shown in Fig. 3.

Having thus described my invention, what I claim, and desire to secure by Letters Patent, is:—

1. The combination with a car bolster, of a downwardly depending side bearing member vertically movable relatively to the bolster, and means for securing said side bearing rigidly in preferred vertical position relative to said bolster.

2. The combination with a car bolster, of a downwardly depending side bearing member vertically adjustable relatively to the bolster, and means for securing said side bearing rigidly in preferred vertical positions relative to said bolster.

3. The combination with a car bolster, of a side bearing vertically adjustable relative to said bolster, and washer and key means carried by said bearing member for securing said side bearing member in preferred vertical position relative to said bolster.

4. The combination with a car bolster, of a side bearing member of substantially T shape, a recess in said bolster adapted to receive the stem of the T shaped side bearing member, washers adapted to be carried by the stem of said T shaped side bearing member, and securing means for securing said side bearing member and washers to said bolster.

5. The combination with a car bolster, of a side bearing member of substantially T-shape, washers for adjusting the vertical position of said side bearing member, and means for securing said side bearing member and washers in said bolster.

6. The combination with a car bolster, of a side bearing member, a recess in said bolster, adapted to receive a portion of said side bearing member, washers for adjusting the vertical position of said side bearing member, and means for securing said side bearing member and washers to said bolster.

7. In a car bolster, a side bearing member of substantially T shape, a vertical recess in said bolster adapted to receive the stem of said T shaped bearing member, a washer on the stem of said T shaped bearing member, and an aperture in said bolster to receive said washer, and means for securing the stem of said T shaped bearing member in the said recess and aperture in said bolster.

8. The combination with a car bolster, of a side bearing member vertically movable relative to said bolster, a stem portion integral with said side bearing member, a pin passed through said stem portion, and means interposed between said bolster and pin for adjusting said side bearing member.

9. The combination with a car bolster, of a side bearing vertically adjustable relative to said bolster, a plurality of washers between said bolster and side bearing, and means engaging said side bearing and washers for securing said side bearing in preferred vertical position.

10. The combination with a car bolster, of a side bearing mounted in said bolster, washers on said side bearing engaging with said bolster and means passed through said side bearing engaging with said washers for securing said side bearing in preferred vertical position.

11. In a car bolster having a recess and an aperture formed therein, a side bearing having a portion which is adapted to fit in said recess, washers on said side bearing engaging with the bottom of said aperture, and means engaging said washers and side bearing for securing said side bearing in preferred vertical position.

12. The combination with a car bolster, of a side bearing member mounted within said bolster, means interposed between said side bearing member and bolster for adjusting the height of said side bearing member relative to said bolster, and means for locking said side bearing member in preferred adjusted position.

13. The combination with a car bolster, of a side bearing member having a stem portion and a bearing portion, means for securing said stem portion to said bolster and adjusting means interposed between said securing means and bolster, said adjusting means being adapted to be shifted from between said securing means and said bolster to a position between said bearing portion and said bolster to effect adjustment of said side bearing member.

14. The combination with a car bolster, of a downwardly depending side bearing member, adjusting means interposed between said side bearing member and bolster adapted to effect an adjustment of said side bearing member, and means on said side bearing member adapted to engage said adjusting means and secure said side bearing member in preferred adjusted position to said bolster.

15. The combination with a bolster, of a side bearing member, means for holding said side bearing member in said bolster, and shiftable adjusting means interposed between said bolster and side bearing member.

16. The combination with a bolster, of a side bearing member depending downwardly therefrom, a key passed through said side bearing member, and shiftable adjusting means interposed between said bolster and key.

17. The combination with a bolster, of a T-shaped side bearing member mounted therein, a key passed through the stem of said side bearing member, and shiftable adjusting means interposed between said bolster and key.

18. The combination with a bolster, of a side bearing member vertically adjustable relative to said bolster, shiftable adjusting means on said side bearing member and bolster, and means carried by said side bearing member adapted to engage said adjusting means and secure said side bearing member in preferred adjusted position.

19. The combination with a bolster, of a side bearing member mounted in said bolster, shiftable means on said side bearing member engaging with said bolster, and means passed through said side bearing member adapted to engage said shiftable means to secure said side bearing member in preferred vertical position.

20. In a car bolster, a side bearing member of substantially T shape, a vertical recess in said bolster adapted to receive the stem of said T shaped bearing member, shiftable means on the stem of said T shaped bearing member, and an aperture in said bolster to receive said shiftable means, and means for securing the stem of said T shaped bearing member in the said recess and aperture in said bolster.

In testimony whereof I affix my signature in presence of two witnesses.

BURNS D. LOCKWOOD.

Witnesses:
FRANK E. MILLER,
LILA M. GRUNDER.

Copies of this patent may be obtained for five cents each, by addressing the "Commissioner of Patents, Washington, D. C."